(12) United States Patent
Ying et al.

(10) Patent No.: US 6,934,793 B2
(45) Date of Patent: Aug. 23, 2005

(54) USB SHARER FOR USE WITH AN EXTERNAL USB DEVICE

(75) Inventors: Cherng-Ying Ying, Taipei (TW); Ta-Lung Yu, Taipei (TW)

(73) Assignee: Action Star Enterprise Co., Ltd., Taipei (TW)

( * ) Notice: Subject to any disclaimer, the term of this patent is extended or adjusted under 35 U.S.C. 154(b) by 363 days.

(21) Appl. No.: 10/190,507

(22) Filed: Jul. 9, 2002

(65) Prior Publication Data

US 2003/0172223 A1 Sep. 11, 2003

(30) Foreign Application Priority Data

Jun. 3, 2002 (TW) .......................... 91111803 A

(51) Int. Cl.[7] .............................................. G06F 13/00
(52) U.S. Cl. ........................................ 710/316; 710/63
(58) Field of Search .............................. 710/316, 2, 63, 710/72, 300, 305; 361/681, 683, 686; 713/501; 709/253; 345/961; 370/402, 916; 714/4

(56) References Cited

U.S. PATENT DOCUMENTS 5,339,096 A * 8/1994 Beaufort et al. ............ 345/156
5,790,776 A * 8/1998 Sonnier et al. ............... 714/10
6,233,702 B1 * 5/2001 Horst et al. .................... 714/48
6,385,203 B2 * 5/2002 McHale et al. ............. 370/401
6,496,940 B1 * 12/2002 Horst et al. ..................... 714/4

OTHER PUBLICATIONS

"Novel output buffer designs for universal serial bus IC applications" by Hwang-cherng Chow, Chen-Yi Huang, Chih-Hong Chang (abstract only) Publication date:Dec. 17–20, 2000.*

* cited by examiner

Primary Examiner—Gopal C. Ray
(74) Attorney, Agent, or Firm—Troxell Law Office, PLLC

(57) ABSTRACT

A computer accessory device—USB share is comprised of a multiplexer, which is connected to a computer host; a human interface device (HID) chip, which is connected to one output end of the multiplexer; a device output end, which is connected to another output end of the multiplexer; and a busyness detection module, which is connected to the middle of the HID chip and the device output end. The USB sharer may reach a sharing function of "N to 1" by applying N-1 sets of "2 to 1" sharer. Wherein, at least one "2 to 1" sharer's output end is connected to the device output end and, for other N-2 sets of "2 to 1" sharer, of which at least one output end is connected to the input end of another "2 to 1" sharers.

10 Claims, 5 Drawing Sheets

USB SHARER FOR USE WITH AN EXTERNAL USB DEVICE

FIELD OF THE INVENTION

The invention relates to a connection device belonging to the computer accessory apparatus and, particularly to a USB sharer of the computer accessory apparatus.

BACKGROUND OF THE INVENTION

Computer applies web connection that includes hardware and software to reach the objective of resource share, for example, the accessory device of computer hard disc data and printer, etc., which have already been the popular solutions in today's technology but, for the user of non-enterprise, especially for the common home computer, the web device is very expansive. Even for a small venture exclusively with its own investment or offices, the users can not afford the construction of an entire web. Because of insufficient budget, this sort of customer is very desired for the common computer devices.

Taking the printer—the most popular computer accessory device as an example, it is scarce for every computer belonging to each user to be matched with a printer respectively, so the requirement for common device is very important in consideration of economic effectiveness. Therefore, how to supply more economic and fast accessory devices that can be used commonly has already become a problem to be solved anxiously by current market and industry.

The prior technique may manipulate a printer's input/output switch by hand and since its operation is manual, so it is very inconvenient. It is more convenient to apply the software in the user's host for switching the printer. However, the internal elements of this kind of switching device are very tedious. It must use more pieces of controlling chips to reach the purpose of control. Taking a "2 to 1" switch as example, at least two universal serial buses (USBs) must be applied, the controlling software programs are very complicated, and its price is also much more expansive.

Please refer to FIG. 1, which is a system illustration taking a "2 to 1" device according to the prior arts as an example. The hosts AP0 and AP1 of the user side, through the output ports of the terminal of a universal serial bus (USB), may be connected to a sharer 11, which is passed and transferred by a multiplexer 15 to make the host AP1 of the connection side connected to a universal serial bus-hub 12 (USB-HUB), wherein the hub itself has a controlling IC, under which is connected to a USB controlling chip 13 and a USB output end 16 and, through a device connection port 17, a further connection is made to an external USB accessory device, such as the devices of printer, digital camera, etc. (not shown in the figure), while the host AP0 of non-connecting side is then connected to a USB controlling chip 14.

Above device output end 16 may be randomly connected to the external USB device, such as: printer, mouse, or scanner, etc. However, the USB controlling chip must be installed at the computer side and controlled under both the relative driving program defined by the USB controlling chip and the software responsible for switching, so the switching instruction may be directly transferred through the USB controlling chip from the AP0 or AP0 host of the user side to order the multiplexer to switch the computer of the connection side, for example, switching the original host AP1 to the host AP0.

Above sharer 11 of "2 to 1" type applies two USB controlling chips and one hub IC and, similarly, a "3 to 1" sharer needs three USB controlling chips and one hub IC and, in the same way, a "N to 1" sharer has to use N pieces of USB controlling chips and one hub IC. Besides the applied parts are more, its controlling software is also more complicated, and it has a restriction caused by the specifications, such as USB 1.1 being unable to be compatible with USB 2.0.

Besides above shortcomings, the prior sharer also has certain popular problems. For example, when a switching instruction is executed, the original host of the connection end—such as AP1 using the accessory device must be ordered to be off line, then the host AP0 of the connection end may make a connection order, such that a great risk is created for the user. For example, if the user shuts off the host AP1 that is still on line with a printer, then it is impossible for another user of the host AP0 to use the printer commonly, and the user of the host AP0 must restart the host AP1 to make an order of cutting off, such that he can make an on line order from the host AP0. This procedure is more inconvenient than the switching function made by hand.

SUMMARY OF THE INVENTION

In order to overcome the shortcomings of the traditional sharers, the objective of the invention is to propose a simpler method and system device to further control the sharer more conveniently with more precise elements. The method and device proposed by the invention applies fewer elements to reach a better effectiveness than that of the prior device.

Another objective of the invention is to replace the USB hub and the USB controlling chip with a HID controlling chip such that, by using a standard and easily developing software, the invention won't be controlled by the restriction of any inspection, so it has a better advantage of cheap cost.

Further objective of the invention is that, when a switching order is executed, the originally on-line host does not need to make an order of off line, instead the following host of the connection end may directly make an order of on line to use the common devices.

A further another objective of the invention is that, through the busyness detection circuit, when the system is at a very busy state, it may switch the using authority of the accessory device at any time without using any kind of hub IC, instead a multiplexer is used to directly distribute the line path to the device output end conveniently.

A further another objective of the invention is to apply a HID chip, such that the user of the host of the connection side may directly order the HID through keyboard or mouse. Through the busyness detection made by the HID, the HID then orders the multiplexer to switch, such that a trouble of making a reorder to cut off the line path from the original host may be skipped.

A further objective of the invention is to apply three sets of "2 to 1" sharer to achieve a "4 to 1" sharer, wherein the structural output ends of two sets of "2 to 1" sharer are connected to another "2 to 1" sharer for comprising a "4 to 1" sharer.

Another objective of the invention is to apply the structural output ends of two sets of "4 to 1" sharer to one "2 to 1" sharer for comprising a "8 to 1" sharer, and et cetera.

Another objective of the invention is to apply three colors of red, yellow, and green to represent different "on line" situations on the screen of the host, such that it may clearly tell the user the current situation of the host, so the use may operates under a more friendly atmosphere.

For further deeply describing the invention, a detailed description together with corresponding drawings is pre-

DETAILED DESCRIPTION OF THE INVENTION

For your esteemed members of reviewing committee to further understand the invention, several attached drawings, detailed structure of the invention, and its connection relationship are presented as follows.

Figure 1:
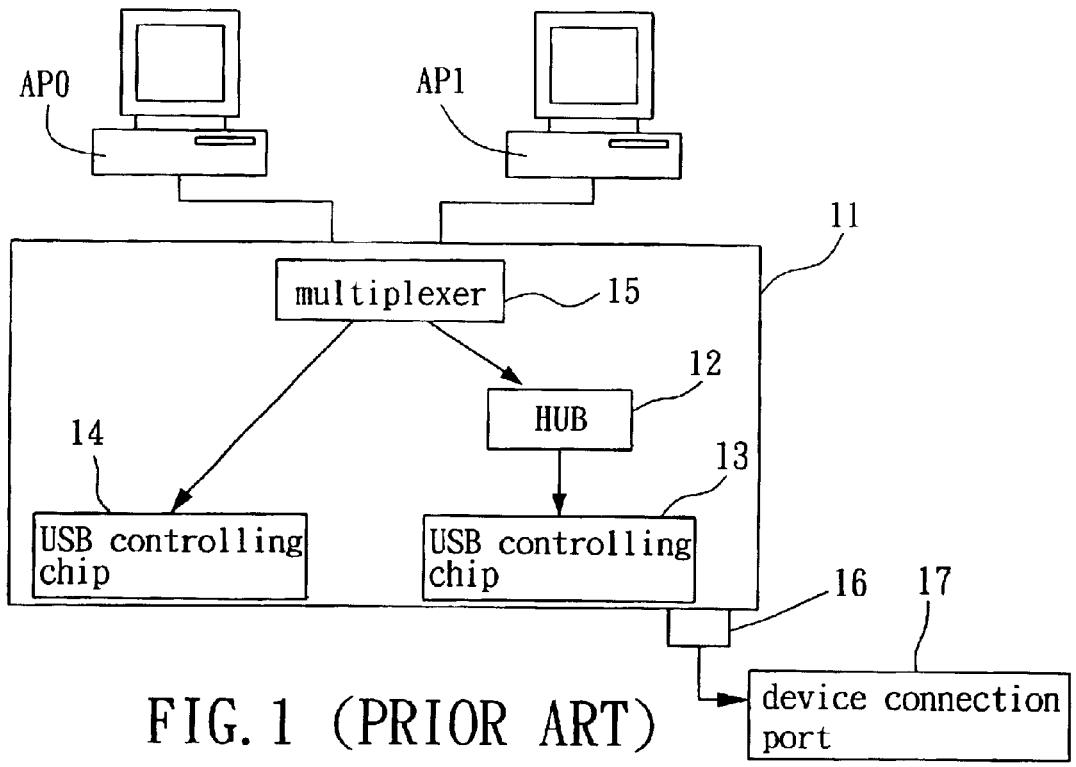
FIG. 1 is a systematic illustration for the "2 to 1" sharer according to the prior arts.
Figure 2:
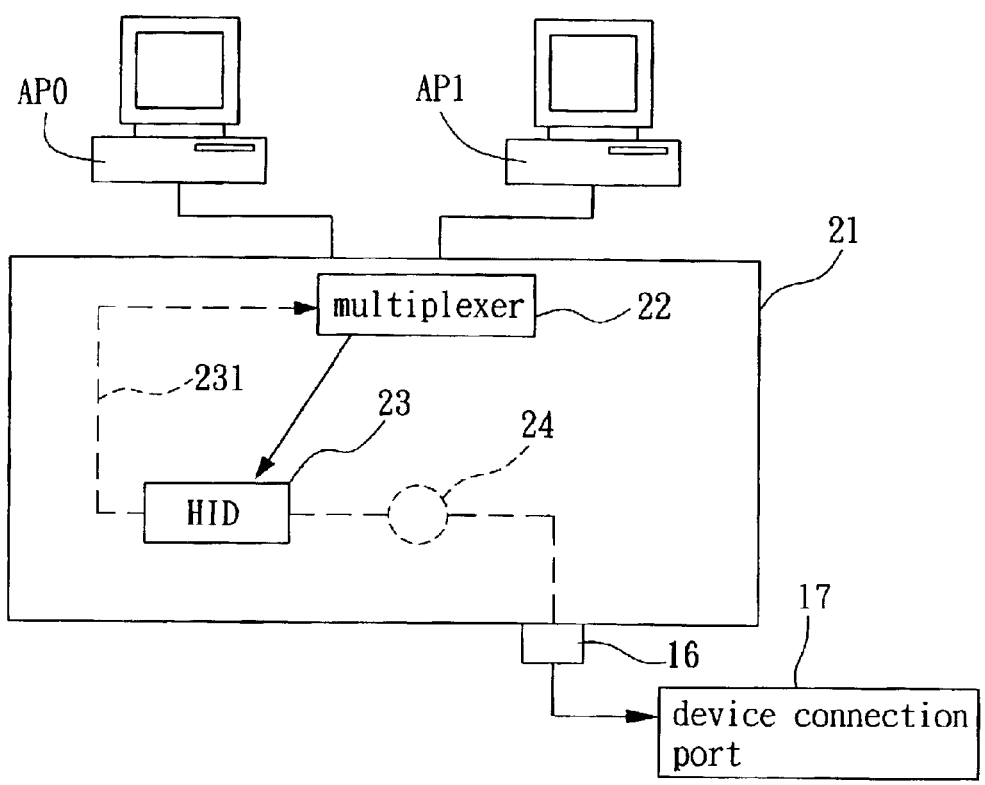
FIG. 2 is a structural illustration for the system of a "2 to 1" sharer according to the invention.

Please refer to FIG. 2, which is a system structural illustration according to the invention, wherein a "2 to 1" sharer 21 is taken as an example. The host AP1 of the connection side, through a multiplexer 22, is directly connected to a USB device output end 16, and its non-connection side is connected to a human interface device 23 (HID), through which a switching order is made to the multiplexer 22. A busyness detection circuit 24 that is a comparative line path module is connected to the device output end 16 for detecting whether the line path is under a busy state.

When the host AP0 is going to execute a switching order, according to the signal transferred from the busyness detection circuit 24, whether the system is busy or not is judged. If the system is busy, then it means that other host is using the computer accessory device then, through the connection line 231 of the HID, a signal is transferred to the host to tell the device being busy. If the device is idle, then the HID makes an order to the multiplexer 22 for executing the switching action.

In the system of above sharer 21, since the connected host AP1 of the connection side is not connected to the HID controlling chip, so it is unnecessary to make an off-line order, neither does make a on-line order (because it has already been under an on-line state). At this time, the controlling authority to make a connection order is belonged to the off-line host AP0 that is connected to the HID. Through the busyness detection circuit 24, when the device is at idle state, it may always switch the usage authority of the accessory device.

Applying this system structure, it is unnecessary to apply any hub IC. The multiplexer will directly distribute the line path to the device output end 16. Not only is the cost of the element saved, but also is the connection more efficient and more convenient. Applying the HID chip 23, a user may use the keyboard or the mouse of the host of the connection side to directly make a switching order to the HID, through which a busy state is checked, and the HID again make an order to the multiplexer to switch, so the trouble of making an off-line order from the original host is skipped. At the same time, since only one HID chip 23 belonging to one standard is used and its interior is also adopted with the standard HID class and the operation system supporting the USB all supplies the driving program with standard HID class so, as long as the externally attached USB device is qualified to the HID class, it then can use the driving programs supplied by the operation system without any additional driving program. The application of the standard driving program not only can avoid the difficulties on design, but also can enhance the stability of the system.

Figure 3:
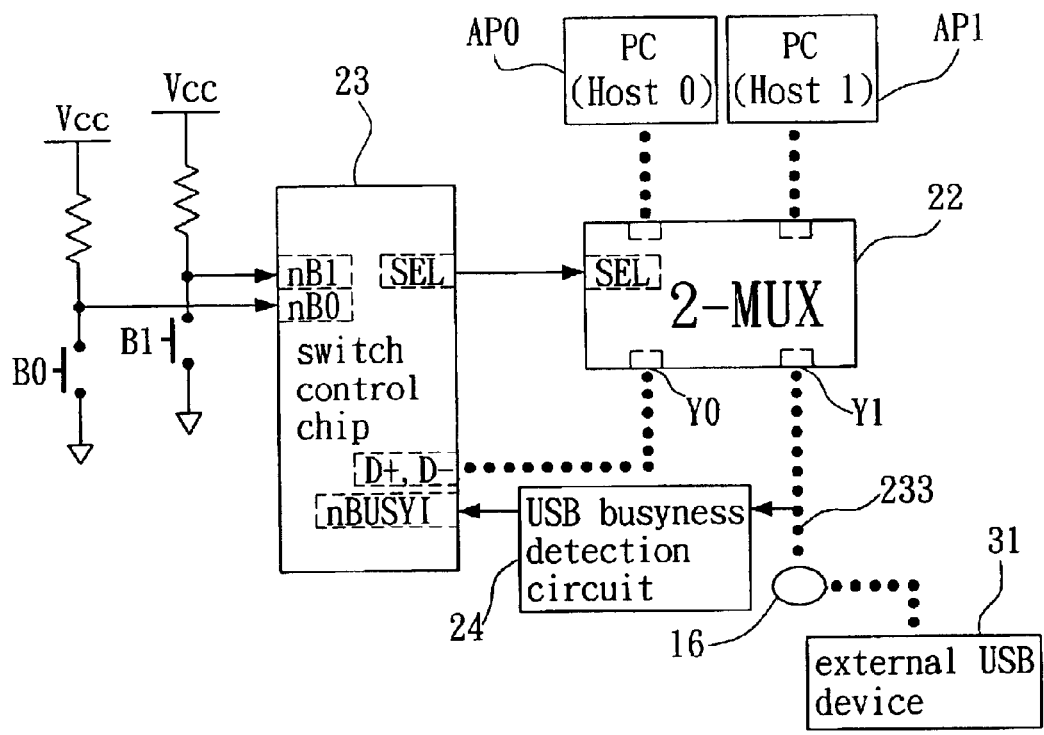
FIG. 3 is a connection illustration for the circuit of a "2 to 1" sharer according to the invention.

Please refer to FIG. 3, which is an illustration for the circuit connection for the "2 to 1" sharer according to the invention. The host AP0 (Host0) and the AP1 (Host1) are connected to a multiplexer 22, wherein an output end Y1 is connected to the device output end 16 for driving an external USB device 31. Another output end Y0 is connected to the data input ends D+ and D− of the HID chip 23, which is a switch controlling chip for receiving the nB0, nB1 of two switches B0 and B1 and the orders from the data input ends D+, D− of the PC side. Through controlling the "2 to 1" multiplexer 22 (2-MUX) by the SEL side, a switching action is executed, and the control chip 23 itself is a USB device too.

The USB busyness detection circuit 24 is responsible for checking whether the signals D+ and D− of the USB signal line 223 of the external USB device have already been changed or not, which will be based for deciding whether the external USB device is busy or not. If no change is detected, then the output end of the busyness detection circuit 24 outputs "1". If a change is detected (it is busy), then the busyness detection circuit 24 outputs "0". When the control chip 23 finds the busyness state detection end—nBUSY1 equaling to "0", then any switching action is prohibited.

When nBUSY1 equals to "1" (it means very busy) and the switch B0 is pushed down (nB0 equals to "0"), the host makes a switching order through the control chip 23 together with the signals induced from the data input ends D+ and D− to make the SEL side equal to "1". At this time, the multiplexer 22 makes AP0 (Host0) connected to the external USB device 31 and also makes AP1 (Host1) connected to the control chip 23. With same reason, if nBUSY equals to "1" and another switch B1 (nB1 equals "0") is pushed down, then the switching action executed by the control chip 23 will make SEL side equal to "0" and the AP1 (Host1) will be connected to the external USB device, while AP0 (Host0) will be connected to the control chip 23. However, above relationship can be summarized as following: when the interruption signals nB1 equals to "1", nB0 equals to "0", and nBUSY1 equals to "1", then the result will be SEL equaling to "1" and, when nB1 equals to "0", nB0 equals to "1", and nBUSY1 equals to "1", then the result will be SEL equalling to "0".

For above switches B0 and B1, the interruption signals can be triggered on to make nB0 equal to "0" when the host AP0 makes an switching order at a normal setting procedure and, at this time, nB0 equals to "0" and nB1 equals to "1". When the host AP1 makes a switching order, then the nB0 equals "1" and the nB1 equals to "0", both which will be taken as switching signal source, and both nB0 and nB1 are not equal to "1" at the same time. After the switching order sets a predetermined time period, the nB0 and nB1 are restored automatically back to "1" for waiting next triggering-on interruption signal.

For a computer side at initial state, if the host side AP1 (Host1) is connected to the external USB device 31, the AP0

(Host0) is connected to the control chip 23 and, at this time, the host side is executing a program corresponding to the control chip 23 and the program then makes a switching order to the control chip and, after the control chip 23 receives the order, it is too busy to execute the switching action, then the SEL side will be inverted to make the AP0 (Host0) connected to the external USB device and the AP1 (Host1) connected to the control chip 23.

Figure 4:
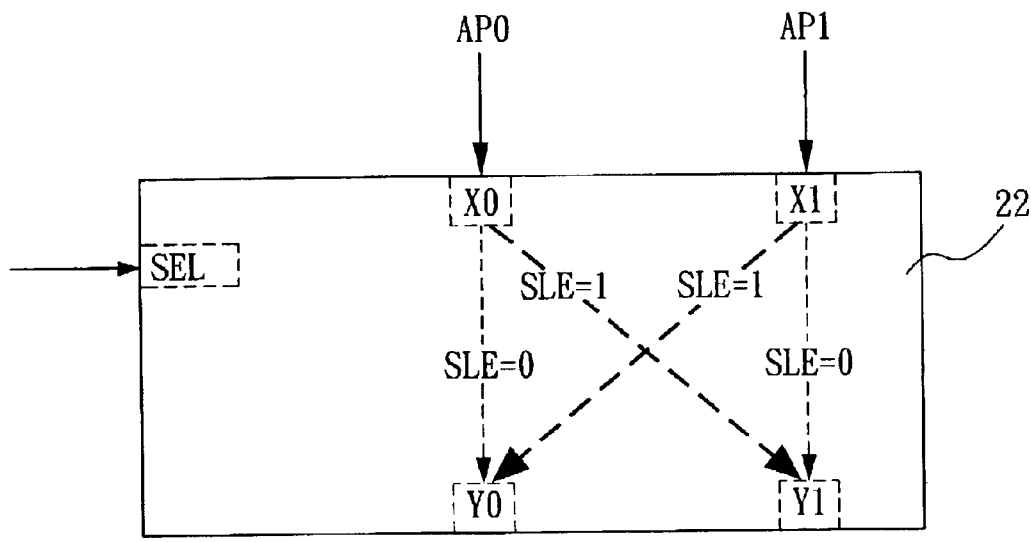
FIG. 4 is an illustration for the switching relationship between a multiplexer and a SEL side according to the invention.

Please refer to FIG. 4, which is an illustration for the relationship between the above SEL side and the multiplexer 22. When SEL equals to "0", the end points X0, Y0 are passing path and the end points X1, Y1 are passing path but, when SEL equals to "1", the end points X0, Y1 are passing path and the end points X1, Y0 are passing path. Wherein, the X0 side is connected to the host AP0 and the X1 side is connected to the host AP1.

Figure 5:
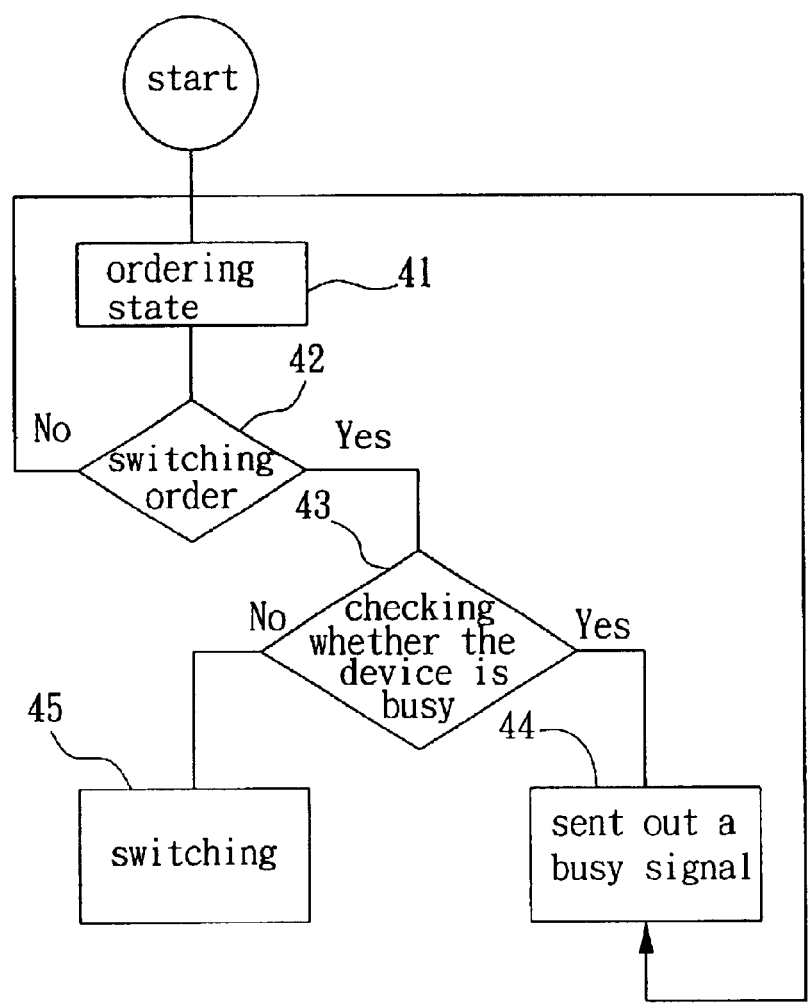
FIG. 5 is a flow chart for the HID chip according to the invention to control the switching software.

The operation of above HID chip 23 is acted as a switch, which controls the open and close of two hosts, and of which driving program has an application software corresponding to the HID switch control chip 23. This software supplies an interface to tell a user about current state for making a switching order. Please refer to FIG. 5, which is a flow chart for controlling the software. After initialization, the HID is under a waiting state. When the host makes a switching order, the HID actuates an ordering state 41 for ensuring that the switching order 42 output to device has been received. Through the signal transferred from the comparative line path module 24, a judgement checking whether the device is busy 43 is ensured. If the device is busy, then a busy signal is sent out 44 without switching and, if the device is idle, then the switching process is executed 45.

Figure 6:
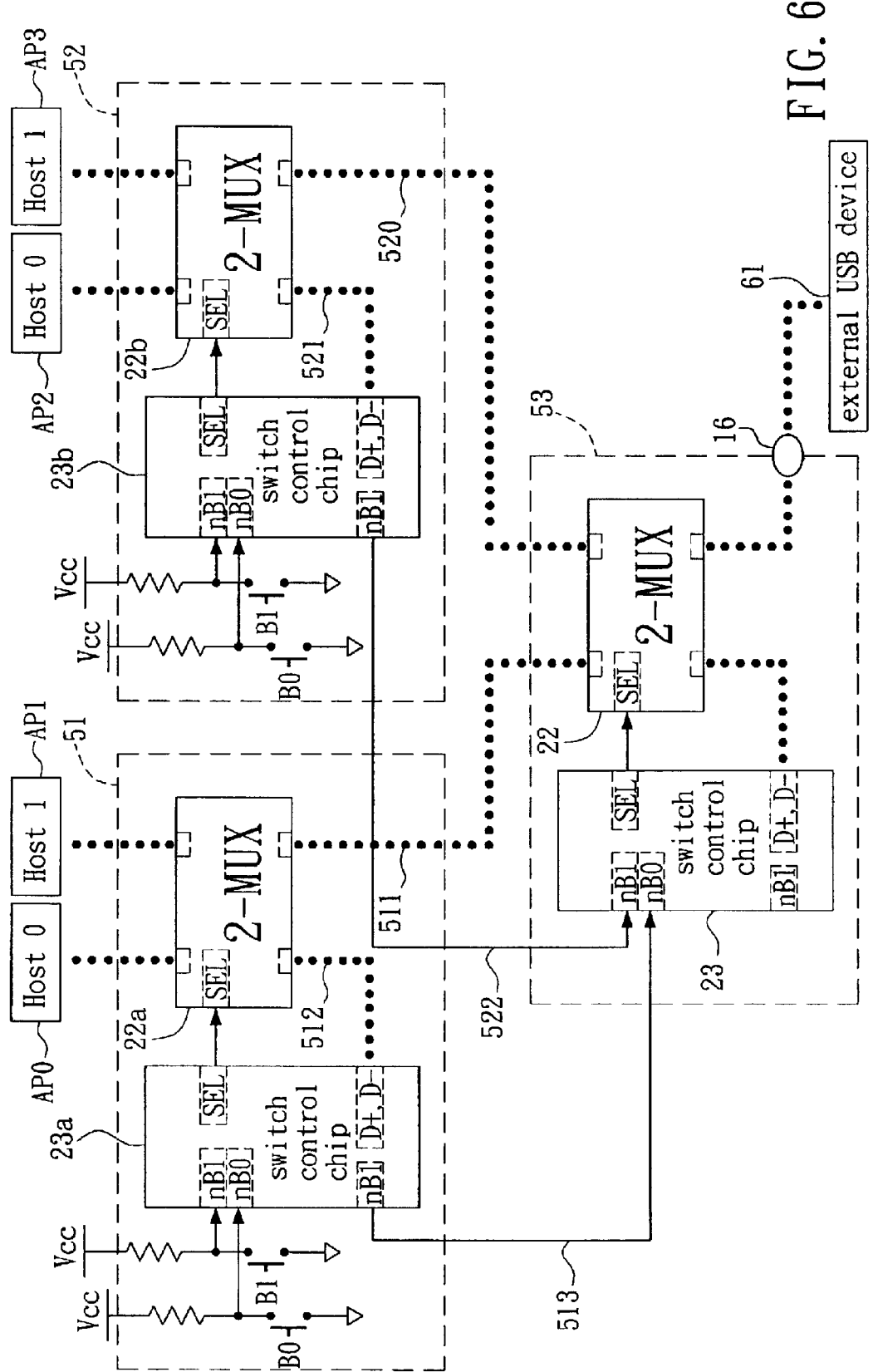
FIG. 6 is a connection illustration for the line paths of the "4 to 1" sharer according to the invention.

Please refer to FIG. 6, which is a connection illustration for the line paths of a "4 to 1" sharer according to the invention (in this figure, a busy state is assumed; that is, nBUSY1 equals to "1", and the part of the USB busyness detection circuit is skipped), wherein three sets of "2 to 1" sharer comprise a "4 to 1" sharer, and the hosts AP0, AP1 and the hosts AP2, AP3 are a pair of "2 to 1" sharer 51, 52 respectively, of which the device output ends 511, 520 are taken as the input ends of another "2 to 1" sharer 53. Wherein, the nBC side outputs a switching signal and is connected to the next level and, when the control chip is executing a switching action, a "nBC=0" is output, otherwise "nBC=1".

For a host AP3 being in an initial state and connecting to an external USB device (SEL is all equal to "0" for any initial state), when the host AP2 makes a switching order, its switching signal through the connection line 521 reaches the data input ends D+ and D−, and the nB0 of the sharer 52 is equal to "0". At this time, the SEL side equals to "1", and the multiplexer 22b is switched to make the host AP2 connected to the output end of the sharer 52. At mean time, because of the switching action of the sharer 52, the output of the nBC side of the control chip 23b equals to "1" and, through the line path 522, the nB1 of the sharer 53 equals to "1". Since there is no switching action for the sharer 51, so the nBC equals to "1", even when the nB0 of the sharer 53 equals to "1". At this time, for the sharer 53, the SEL equals to "0", and the result is that the sharer 53 does not execute the switching action. At last, the AP2 through the device output end 16 is connected to the external USB device 61.

The above examples are the working principles and the structures of the system's line paths for the "2 to 1" and the "4 to 1" sharers. The output ends of the two sets of "2 to 1" structure are connected to another "2 to 1" sharer, the result is that a "4 to 1" sharer is constructed. With the same manner, if the output ends of the two sets of "4 to 1" structure are connected to one "2 to 1" sharer, then a "8 to 1" sharer may be constructed easily. The "any number to one" sharer can be constructed according to this method. For a "2 to 1" sharer, only one "2 to 1" sharer is needed for the switcher for two sets of hosts versus one USB device. For a "4 to 1" sharer, three "2 to 1" sharers are needed for constructing the switcher for four sets of hosts versus one USB device. Similarly, for a "8 to 1" sharer, only seven "2 to 1" sharers are sufficient for eight hosts. That is, for a sharer being applied to the N hosts versus one USB device, only N−1 sets of "2 to 1" sharers are needed for achieving the purpose of constructing a "N to 1" sharer.

Figure 7:
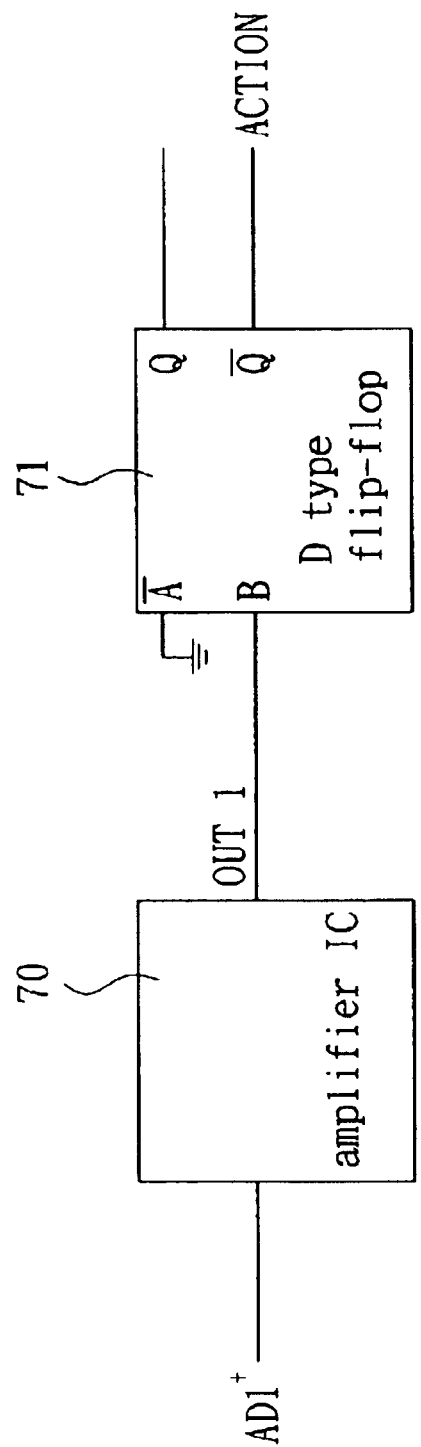
FIG. 7 is an executing illustration for the busyness detection invention according to the invention.

Additionally, in order to make the application of the "N to 1" sharer be more friendly, the condition of the on line of the host may be displayed in each host, such as three colors of red, yellow, and green may be represented three states of on line. When the red light is displayed on the screen of the host, it represents that the host is off line and other host is using a USB device; that is, the sharer is busy and this host can not switch the sharer. When the yellow light is displayed on the screen of the host, it means that this host is not in an on line state and no any other host is using the USB device; that is, the sharer is idle and, at this time, this host may switch and use the external USB device of the sharer and, after switching, this host is at the on line state, then the green light is displayed on the screen of the host. Please refer to FIG. 7, of which the busyness detection circuit 24 is a amplifier IC70, of which the input side AD1+ receives the D+ signal within the system and magnifies the signal of 3.3 volt into the signal of 5 volt, then the magnified signal is output from the output side OUT1 to the input side B of the D type flip-flop 71 of the D-type, so a signal of square wave is output from the ACTION side and is taken as the busyness detection signal of the invention.

For executing above preferable embodiments according to the invention, it is unnecessary to use any HUB IC, so the price is lower and, since the standardized human interface device (HID) chip has replaced the universal serial bus (USB) control chip, so an effectiveness of easy control and user friendliness is reached. At mean time, since its cost is further lowered down and the effectiveness is excellent, so it is really an innovative and progressive invention and is indeed fulfilled the merits of patent application law. However, one thing is needed to claim: all the embodiments proposed by the invention are not the restrictions for this invention, and the same principles, methods, or other equivalent variations according to the invention are also covered within the range claimed by the present invention.

What is claimed is:

1. A USB sharer for use with an external USB device comprising:
    a) a device output end (16) connected to an input end of the external USB device;
    b) a multiplexer having:
        i) an input end connected to a host;
        ii) a first output end connected to the device output end by a signal line; and
        iii) a second output end;
    c) a human interface device chip connected to the second output end of the multiplexer; and
    d) a busyness detection circuit connected to the signal line and the human Interface device chip.

2. The USB sharer according to claim 1, wherein the human interface device chip receiving a switching order from the host and sending the switching order to the multiplexer.

3. The USB sharer according to claim 1, wherein, when the busyness detection circuit detects a busy state, the busyness detection circuit transferring a busy signal to the human interface device chip, the human interface device chip transferring the busy signal to the host for display on a screen of the host.

4. The USB sharer according to claim 1, wherein, when the busyness detection circuit detects a idle state, the busyness detection circuit transferring the idle signal to the human interlace device chip, the human interface device chip sending a switching order to the multiplexer, the multiplexer executing the switching order.

5. The USB sharer according to claim 1, wherein the second output end of the multiplexer is connected to a data input side of the human interface device chip.

6. The USB sharer according to claim 1, wherein the multiplexer has an output side executing a switching action.

7. The USB sharer according to claim 1, wherein the human interface device chip is a standard universal serial bus device.

8. The USB sharer according to claim 1, wherein the human interface device chip receiving nB0 and nB1 signals and having an SEL side controlled by the nB0 and nB1 signals.

9. The USB sharer according to claim 1, wherein the human interface device chip receiving nB0 and nB1 signals in a triggering on-state at different time periods.

10. The USB sharer according to claim 1, wherein the human interface device chip receiving nB0 and nB1 signals that are automatically reset to zero after a predetermined amount of time.

* * * * *